No. 660,449. Patented Oct. 23, 1900.
C. H. METZ.
BICYCLE GEARING.
(Application filed Mar. 2, 1899.)
(No Model.) 3 Sheets—Sheet 1.
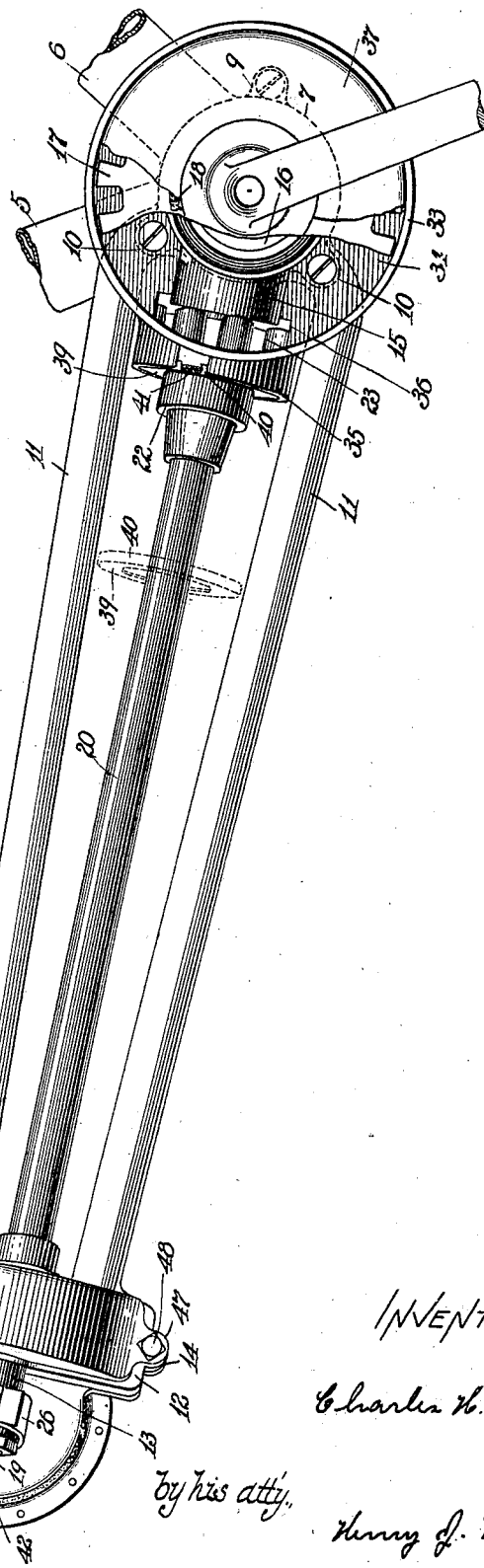
Fig. 1.
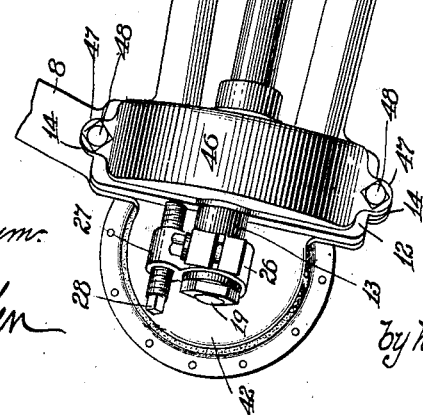
WITNESSES
Wm. H. Varnum
A. W. Hamblen
INVENTOR
Charles H. Metz
Henry J. Miller
by his atty.
THE NORRIS PETERS CO., PHOTO-LITHO., WASHINGTON, D. C.

No. 660,449. Patented Oct. 23, 1900.
C. H. METZ.
BICYCLE GEARING.
(Application filed Mar. 2, 1899.)
(No Model.) 3 Sheets—Sheet 2.
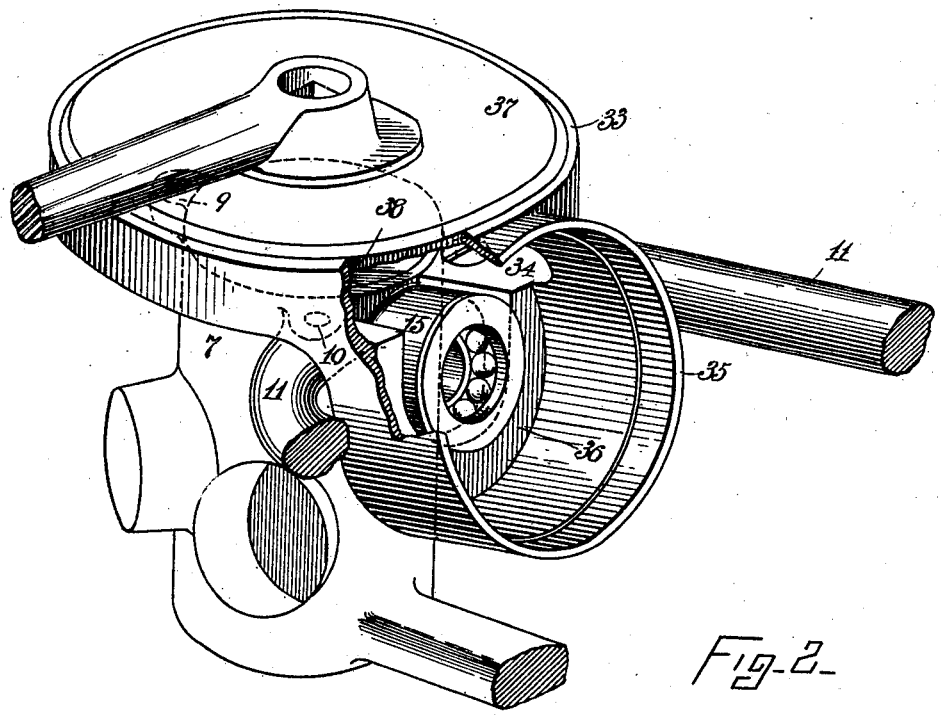
Fig-2-
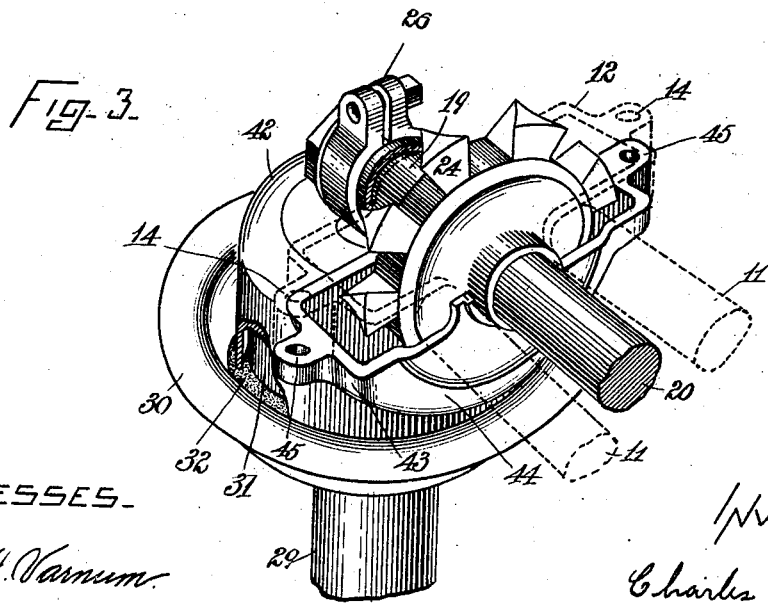
Fig-3-
WITNESSES
Wm. H. Varnum
A. W. Hamblen
INVENTOR
Charles H. Metz
by his atty,
Henry J. Miller
THE NORRIS PETERS CO., PHOTO-LITHO., WASHINGTON, D. C.

No. 660,449. Patented Oct. 23, 1900.
C. H. METZ.
BICYCLE GEARING.
(Application filed Mar. 2, 1899.)
(No Model.) 3 Sheets—Sheet 3.
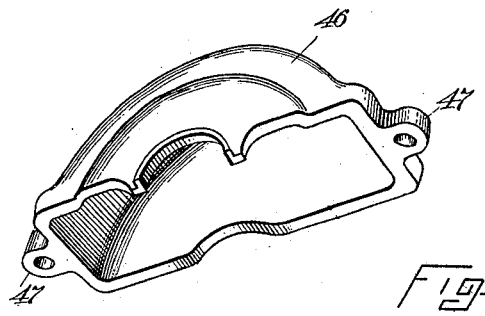
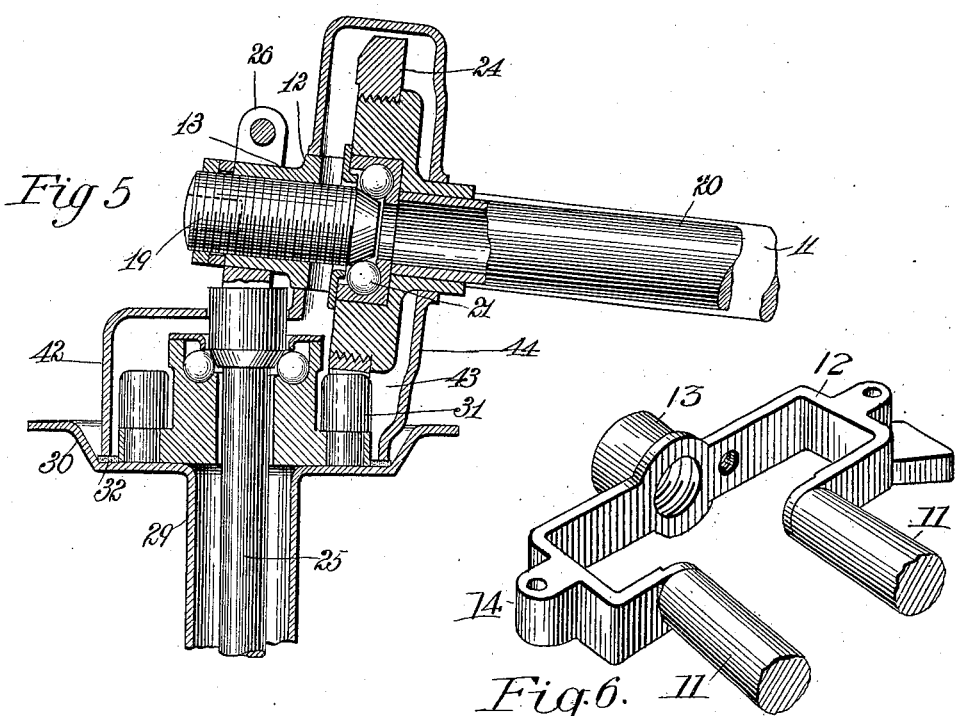
WITNESSES
Wm. H. Varnum
INVENTOR
Charles H. Metz
by his atty,
Henry J. Miller

UNITED STATES PATENT OFFICE.

CHARLES H. METZ, OF WALTHAM, MASSACHUSETTS.

BICYCLE-GEARING.

SPECIFICATION forming part of Letters Patent No. 660,449, dated October 23, 1900.

Application filed March 2, 1899. Serial No. 707,560. (No model.)

*To all whom it may concern:*

Be it known that I, CHARLES H. METZ, of Waltham, in the county of Middlesex and State of Massachusetts, have invented certain new and useful Improvements in Bicycle-Gearing; and I hereby declare that the following is a full, clear, and exact description of the same, reference being had to the accompanying drawings, forming part of this specification.

This invention has reference to improvements in bicycles, and particularly with relation to the means for mounting and protecting the driving mechanism therefor.

One object of the invention is to so construct a bicycle wherein power is transmitted from the crank-shaft to the driven wheel by means of gears and a side shaft that access to said gears may be readily had.

Another object of the invention is to so construct the frame and the gear-casings that the casings may be more readily secured to the frame.

Another object of the invention is to so construct the frame and the gear-casings that the side drive-shaft may be removed therefrom.

Another object of the invention is to improve the construction of the gear-cases.

The invention consists in the construction of the frame and in the peculiar combination therewith of the gear-cases.

The invention also consists in a side frame consisting of a pair of arms extending rearwardly from the crank-hanger sleeve and connected at their rear ends by a yoke and a gear-case secured to said yoke.

The invention also consists in the crank-hanger sleeve having a rearwardly-extending hub and a gear-casing having a sleeve adapted to embrace said hub.

The invention also consists in a frame for a side-shaft-driven bicycle having a yoke adjacent to its rear end and a gear-cap removably secured to such yoke.

The invention also consists in the mounting for the side shaft, in combination with the shaft and its gears, and in the gear-cases.

The invention also consists in such other novel features of construction and combination of parts as shall hereinafter be more fully described, and pointed out in the claims.

Figure 1 represents a side view of portions of a bicycle, partially broken away, illustrating the improved structure. Fig. 2 represents an enlarged perspective view of the crank-hanger and the gear-case secured thereto, parts of the gear-case being broken away to show its construction in relation to the bearing for the side shaft. Fig. 3 represents a perspective view of the hub of the rear wheel with the rear portion of the side shaft, its gear, and portions of the rear gear-case in relation to the frame-yoke. Fig. 4 represents a perspective view of the gear-cap of the rear gear-case. Fig. 5 represents a sectional view of the frame and its gear-case with the rear drive-gears, showing the manner of mounting this end of the side shaft, Fig. 6 being a perspective view of the rear portion of the side frame with the gear-cases removed.

Similar numbers of reference designate corresponding parts throughout.

In the drawings, 5 and 6 represent portions of the braces which ordinarily connect the crank-hanger sleeve 7 with the upper portion of the frame, and 8 is a portion of one of the rear fork-arms. The hub 7 is of any usual construction, but is furnished with the ears 9 and 10 10.

From the hub 7, at points adjacent to the ears 10 10, extend the arms 11 11, which first curve outward and then extend rearward to connect with the vertically-enlarged yoke or gear-frame 12, this yoke being secured to the brace or fork-arm 8 and having the interiorly-threaded collar 13 and the ears 14 14. On the sleeve 7, between the arms 11 11, is the hub 15, provided with a ball-bearing of ordinary construction, the hub 15 and the collar 13 being in axial alinement.

Journaled in bearings in the sleeve 7 is the crank-shaft 16, provided with cranks and with a gear 17, of any usual construction, adapted for use in side-shaft driving, and to the outer surface of the gear is secured the felt washer 18.

Between the bearing in the hub 15 and the screw-threaded cone 19, working in the threaded collar 13, is the exposed side drive-shaft 20, having a forward conical end engaging with the bearing in the hub 15 and a ball-bearing 21 at its rear end, with which the cone 19 engages. On the forward end of the side shaft 20 is the enlargement 22, carrying the gear 23, which meshes with the gear 17, while at the rear end of this shaft is the gear 24, working in the yoke 12.

The rear shaft or axle 25 is secured to the collar 13 by means of the clamping-frame 26 and its bolt, this clamping-frame having the threaded sleeve 27, in which the adjusting-screw 28, bearing on the rear of the yoke 12, works. On the shaft 25 is journaled the hub 29 of the rear wheel, which hub has the enlarged flange 30, carrying the gear 31, adapted to mesh with the gear 24, and embracing the base of this gear 31 is the felt washer 32.

The forward gear-case comprises two annular chambers the axes of which are approximately at right angles. The chamber 33, open at its outer side, incloses the gear 17 and has the bottom 34, open at its center and secured to the ears 9 and 10 10 by means of screws. The chamber 35 of this case, open at its end, incloses the gear 23 of the side drive-shaft and has the U-shaped back 36, which hooks over the hub 15 and forms a holding device for this portion of the case. The open side of the chamber 33 is closed by the disk 37, open at its center to pass over the outer portion of the crank-shaft and having the inwardly-turned lip 38, which has close frictional contact with the inner surface of the chamber. At its central portion the disk bears against the felt washer 18, whereby dust is excluded. The open end of the chamber 35 is closed by the cap 39 embracing the enlargement 22 of the shaft 20 and having the inwardly-turned lip 40 in frictional contact with the inner surface of the chamber. This cap 39 bears against the felt washer 41, mounted on the base of the gear 23.

The rear gear-case comprises the chamber 42, inclosing the gear 31 and having an axially-disposed opening for the shaft 25 and an annular edge which fits against the washer 32. At one side this chamber 42 has a compartment 43, inclined from the axial line of the chamber 42 to correspond to the inclination of the gear 24 to said line and having the wall 44, the edge of this compartment and its wall 44 being shaped to fit closely against this face of the yoke 12, the wall 44 also fitting closely about the hub of the gear 24, and the ends of the case having perforated ears 45 45, corresponding to the ears 14 14 of the yoke. The convex cap 46 has an edge which conforms to the shape of the outer surface of the yoke 12 and of the hub of the gear 24. This cap has also the perforated ears 47 47 and is removably secured by means of the bolts 48 48 to the yoke and to the ears 45 45 of the main portion of the gear-case.

It will be apparent that the disk 37 of the forward gear-case can be readily removed for the inspection of the gears and as readily and securely replaced. This is very important at times in order to disclose to the user the nature and condition of the gears and is of great importance to the purchaser as well.

By the removal of the cap 46 the gears at the rear end of the bicycle can be inspected, while by the unscrewing of the cone 19 the side drive-shaft 20, with its gear and the cap 39, may be withdrawn for the repair of the gears or for the substitution therefor of gears of different pitch.

The exposed adjustment for the rear shaft permits of a degree of adjustment therefor without the removal of the gear-case.

Having thus described my invention, I claim as new and desire to secure by Letters Patent—

1. In a bicycle, the combination with the crank-hanger sleeve having a rearwardly-extending hub, of a gear-case comprising an open-sided compartment provided with a disk for closing the same and adapted to be secured to the hanger-sleeve, and a second compartment open at its end and having a wall which partially embraces said hub whereby the secondary case is secured only by its connection with the main case and the engagement with the hub, and the combined cases are removable by the release of the securing devices for the main case, and a closure for the open end of said second compartment.

2. In a bicycle, the combination with a side drive-shaft frame having at its rear end an enlarged gear-frame furnished with a sleeve projection on said frame, of the rear shaft having means for engaging said projection, means for adjusting the shaft with respect to the frame, a gear-case embracing the shaft at one side of the adjusting and securing devices and fitting against the gear-frame, whereby said devices are exposed for ready access, a cap fitting against the outer surface of the gear-frame, and releasable securing devices for the gear-case and the cap.

3. The combination with the hub 7 having the ears 9 and 10 10 and furnished with the hub 15, of the gear-case comprising the chamber 33 having the bottom 34 secured to said ears, and the chamber 35 having the end 36 adapted to embrace the hub 15 as and for the purpose described.

4. The combination with the hub 7 having the ears 9 and 10 10 and furnished with the hub 15, a crank-shaft rotatable in the hub 7 and having the washer 18, and a side shaft journaled at one end in the hub 15, of the gear-case comprising the chamber 33 having the bottom 34 secured to the ears 9 and 10 10 and the chamber 35 having the end 36 adapted to partially embrace the hub 15, the disk 37 having the lip 38 frictionally engaged with the inner surface of the chamber 33 and the central opening for embracing the outer portion of the crank-shaft, said disk bearing against the washer 18, and the cap 39 mounted on the side shaft and having the inwardly-turned lip adapted to be frictionally engaged with the inner surface of the chamber 35, as and for the purpose described.

CHARLES H. METZ.

Witnesses:
W. STANLEY CAMPBELL,
H. J. MILLER.